United States Patent
Kikuchi

(10) Patent No.: US 9,555,359 B2
(45) Date of Patent: Jan. 31, 2017

(54) PLUGGED HONEYCOMB STRUCTURE

(71) Applicant: NGK Insulators, Ltd., Nagoya (JP)

(72) Inventor: Yoshio Kikuchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 37 days.

(21) Appl. No.: 14/627,258

(22) Filed: Feb. 20, 2015

(65) Prior Publication Data

US 2015/0258483 A1   Sep. 17, 2015

(30) Foreign Application Priority Data

Mar. 14, 2014   (JP) ................ 2014-052419

(51) Int. Cl.
| | |
|---|---|
| *B01D 46/24* | (2006.01) |
| *B32B 3/12* | (2006.01) |
| *C04B 38/00* | (2006.01) |
| *C04B 37/00* | (2006.01) |
| *F01N 3/035* | (2006.01) |
| *C04B 111/00* | (2006.01) |

(52) U.S. Cl.
CPC ......... *B01D 46/244* (2013.01); *B01D 46/2429* (2013.01); *B01D 46/2448* (2013.01); *B32B 3/12* (2013.01); *C04B 37/005* (2013.01); *C04B 38/0016* (2013.01); *B32B 2307/30* (2013.01); *C04B 2111/00405* (2013.01); *C04B 2111/00793* (2013.01); *C04B 2235/9607* (2013.01); *C04B 2237/083* (2013.01); *C04B 2237/09* (2013.01); *C04B 2237/341* (2013.01); *C04B 2237/343* (2013.01); *C04B 2237/365* (2013.01); *C04B 2237/368* (2013.01); *C04B 2237/58* (2013.01); *F01N 3/035* (2013.01); *Y10T 428/24157* (2015.01)

(58) Field of Classification Search
None
See application file for complete search history.

(56) References Cited

U.S. PATENT DOCUMENTS

| | | | |
|---|---|---|---|
| 2004/0076794 A1 | 4/2004 | Hijikata | |
| 2004/0123573 A1* | 7/2004 | Ichikawa | ........... B01D 46/2474 55/523 |

(Continued)

FOREIGN PATENT DOCUMENTS

| | | |
|---|---|---|
| EP | 1 382 374 A1 | 1/2004 |
| EP | 1 440 722 A1 | 7/2004 |

(Continued)

OTHER PUBLICATIONS

Extended European Search Report (Application No. 15157951.3) dated Oct. 9, 2015.

*Primary Examiner* — David Sample
*Assistant Examiner* — Nicholas W Jordan
(74) *Attorney, Agent, or Firm* — Burr & Brown, PLLC

(57) ABSTRACT

There is disclosed a plugged honeycomb structure. A plugged honeycomb structure includes a honeycomb structure body of a segment structure and plugging portions disposed in open ends of cells formed in the honeycomb structure body, the honeycomb structure body has outer segments and inner segments disposed on an inner side than the outer segments in a cross section of the honeycomb structure body, and a material constituting the outer segments has a smaller heat capacity per unit volume than a material constituting the inner segments.

14 Claims, 6 Drawing Sheets

(56) References Cited

U.S. PATENT DOCUMENTS

| | | | |
|---|---|---|---|
| 2004/0131512 A1* | 7/2004 | Abe | B01D 46/2429 422/180 |
| 2004/0142145 A1 | 7/2004 | Hashimoto et al. | |
| 2004/0244344 A1* | 12/2004 | Ichikawa | B01D 46/2429 55/523 |
| 2004/0258582 A1 | 12/2004 | Miwa et al. | |
| 2005/0102987 A1 | 5/2005 | Kudo | |
| 2007/0231539 A1* | 10/2007 | Miyairi | B01D 46/2429 428/116 |
| 2008/0017572 A1 | 1/2008 | Kudo | |
| 2009/0010817 A1* | 1/2009 | Okumura | B01D 53/944 428/116 |
| 2009/0022942 A1* | 1/2009 | Hiramatsu | C04B 38/0019 428/116 |
| 2010/0218473 A1* | 9/2010 | Kikuchi | C04B 38/0051 55/523 |
| 2010/0247853 A1* | 9/2010 | Ichikawa | C04B 38/0009 428/116 |

FOREIGN PATENT DOCUMENTS

| | | | |
|---|---|---|---|
| EP | 1 491 248 A1 | 12/2004 | |
| FR | 2987757 A1 * | 9/2013 | B01D 46/2429 |
| JP | 2003-010616 A1 | 1/2003 | |
| JP | 2003-254034 A1 | 9/2003 | |
| WO | 2006/103963 A1 | 10/2006 | |

* cited by examiner

PLUGGED HONEYCOMB STRUCTURE

The present application is an application based on JP2014-52419 filed with Japan Patent Office on Mar. 14, 2014, the entire contents of which are incorporated herein by reference.

BACKGROUND OF THE INVENTION

Field of the Invention

The present invention relates to a plugged honeycomb structure, and more particularly, it relates to a plugged honeycomb structure in which when the plugged honeycomb structure is used as a filter to trap a particulate matter and the filter is regenerated by burning and removing the particulate matter, the particulate matter hardly remains unburnt in both a circumferential portion and a central portion of the filter, and the number of times to regenerate the filter can be decreased as compared with a conventional plugged honeycomb structure.

Description of Related Art

An exhaust gas discharged from an internal combustion engine such as a diesel engine, each type of combustion device or the like includes a large amount of particulate matter (hereinafter also referred to as "PM") mainly composed of soot. When this PM is discharged as it is into the air atmosphere, an environmental pollution is caused. Therefore, in an exhaust system for the exhaust gas, a particulate filter to trap the PM is mounted. An example of the particulate filter is a diesel particulate filter (DPF) for use in purification of the exhaust gas discharged from the diesel engine.

In such a DPF, there is used, for example, a honeycomb structure having porous partition walls defining a plurality of cells which become through channels for the exhaust gas. In this honeycomb structure, plugging portions to plug open ends of cells are disposed in the open ends of the predetermined cells in an end face on an outflow side of the fluid and the open ends of the residual cells in an end face on an inflow side of the fluid, and hence this honeycomb structure is utilized as a plugged honeycomb structure. Hereinafter, a particulate filter such as the DPF in which the plugged honeycomb structure is used will generically be referred to as "a honeycomb filter" sometimes.

As the honeycomb structure for use in the DPF or the like, there has been suggested, for example, a honeycomb structure of a segmented structure formed by bonding a plurality of honeycomb segments (e.g., see Patent Documents 1 and 2).

In a honeycomb filter such as the DPF, a pressure loss gradually increases due to the PM deposited in the filter with an elapse of time, and hence the PM deposited in the honeycomb filter is periodically burnt and removed to regenerate the filter sometimes. For example, as a method of regenerating the DPF, a regenerating method is known in which a temperature of the exhaust gas discharged from the engine is raised to heat the DPF by use of the exhaust gas at the high temperature. An example of a method of raising the temperature of the exhaust gas is a method in which by post jetting to temporarily excessively jet a fuel in a latter half of an explosion stroke or in an exhaust stroke, the excessive fuel is burnt to raise the temperature of the exhaust gas.

[Patent Document 1] JP-A-2003-10616
[Patent Document 2] JP-A-2003-254034

SUMMARY OF THE INVENTION

As described above, a honeycomb filter such as a DPF is regenerated by utilizing an exhaust gas at a high temperature, but there is the tendency that a temperature of a circumferential portion of the filter hardly rises as compared with a central portion of the filter. Therefore, when the honeycomb filter is regenerated, there is a problem that PM remains unburnt in the circumferential portion of the filter.

Additionally, in recent years, an improvement of a fuel efficiency of a car has been demanded from the viewpoints of global environment protection and resource saving. As to the abovementioned regeneration of the DPF by post jetting, a fuel which is not concerned with an engine output is consumed during the regeneration of the DPF, and hence the more frequently the regeneration takes place, the worse the fuel efficiency of the car becomes. Therefore, for the purpose of improving the fuel efficiency of a diesel engine for the car, decrease of the number of times to regenerate the abovementioned DPF (i.e., a plugged honeycomb structure) is investigated. That is, the consumption of the fuel required for the regeneration is inhibited as much as the decrease of the number of the times to regenerate the DPF, so that the improvement of the fuel efficiency of the engine can be achieved.

However, when the number of the times to regenerate the DPF is decreased, an interval until the regeneration is performed (i.e., a regeneration period) lengthens, and hence during the regeneration, a larger amount of soot than before is deposited on the surfaces of partition walls. Therefore, in a honeycomb filter such as the DPF, there has heretofore been the problem that the PM remains unburnt in the circumferential portion of the filter. Furthermore, when the number of the times to regenerate the DPF is decreased, the abovementioned problem that the PM remains unburnt becomes further conspicuous. Additionally, to solve the problem that the PM remains unburnt in the circumferential portion of the filter, there is contrived a method in which a regeneration time is lengthened to promote burning of the PM in the circumferential portion, but this method is totally contrary to a request concerning the improvement of the fuel efficiency of the engine.

The present invention has been developed in view of the abovementioned problems, and an object thereof is to provide a plugged honeycomb structure suitably usable as a filter to trap particulate matter. In particular, there is provided a plugged honeycomb structure in which when the filter is regenerated by burning and removing the particulate matter, the particulate matter hardly remains unburnt in both a circumferential portion and a central portion of the filter, and the number of times to regenerate the filter can be decreased as compared with a conventional plugged honeycomb structure.

To achieve the abovementioned object, according to the present invention, there is provided a plugged honeycomb structure in the following.

According to a first aspect of the present invention, a plugged honeycomb structure including a honeycomb structure body having a plurality of pillar-shaped honeycomb segments each having porous partition walls defining a plurality of cells which become through channels for a fluid and extend from a first end face to a second end face is provided, and a bonding layer to bond the plurality of honeycomb segments to one another so that side surfaces of the honeycomb segments face one another; and plugging portions disposed in open ends of the predetermined cells in the first end face and open ends of the residual cells in the second end face of the honeycomb structure body, wherein the honeycomb structure body has, as the plurality of honeycomb segments, outer segments disposed on a circumferential side of the honeycomb structure body in a cross section vertical to an extending direction of the cells and inner segments disposed on an inner side than the outer segments in the cross section, and a material constituting the outer segments has a smaller heat capacity per unit volume than a material constituting the inner segments.

According to a second aspect of the present invention, the plugged honeycomb structure according to the above first aspect is provided, wherein the heat capacity per unit volume of the material constituting the outer segments is from 0.60 to 0.95 time as large as the heat capacity per unit volume of the material constituting the inner segments.

According to a third aspect of the resent invention, the plugged honeycomb structure according to the above first or second aspects is provided, wherein the heat capacity per unit volume of the material constituting the inner segments at 600° C. is from 3.80 to 4.50 J/K/cm$^3$.

According, to a fourth aspect of the present invention, the plugged honeycomb structure according to any one of the above first to third aspects is provided, wherein a pressure loss of the outer segments is from 0.90 to 1.10 times as large as a pressure loss of the inner segments.

According to a fifth aspect of the present invention, the plugged honeycomb structure according to any one of the above first to fourth aspects is provided, wherein a porous body constituting each of the outer segments has a higher thermal conductivity than a porous body constituting each of the inner segments.

According to a sixth aspect of the present invention, the plugged honeycomb structure according to any one of the above first to fifth aspects is provided, wherein the porous body constituting the outer segment has a larger thermal expansion coefficient than the porous body constituting the inner segment.

According to a seventh aspect of the present invention, the plugged honeycomb structure according to the above sixth aspect is provided, wherein the thermal expansion coefficient of the porous body constituting the outer segment is from 1.20 to 1.60 times as large as the thermal expansion coefficient of the porous body constituting the inner segment.

According to an eighth aspect of the present invention, the plugged honeycomb structure according to any one of the above first to seventh aspects is provided, wherein the inner segments are constituted of either a material including aluminum titanate or a material including aluminum titanate and α-Al$_2$O$_3$.

According to a ninth aspect of the present invention, the plugged honeycomb structure according to any one of the above first to eighth aspects is provided, wherein the outer segments are constituted of SiC, Si, Si$_3$N$_4$, cordierite, mullite, or a material including at least two of these materials.

According to a tenth aspect of the present invention, the plugged honeycomb structure according to any one of the above first to ninth aspects is provided, wherein in a cross section of the honeycomb structure body which is vertical to the cell extending direction, an area ratio of the inner segments to the outer segments is from 70/30 to 10/90.

According to an eleventh aspect of the present invention, the plugged honeycomb structure according to any one of the above first to tenth aspects is provided, wherein in the cross section of the honeycomb structure body which is vertical to the cell extending direction, the inner segments and the outer segments are linearly symmetrically disposed.

According to a twelfth aspect of the present invention, the plugged honeycomb structure according to any one of the above first to eleventh aspects is provided, wherein a porosity of the porous body constituting the honeycomb structure body is from 20 to 50%.

According to a thirteenth aspect of the present invention, the plugged honeycomb structure according to any one of the above first to twelfth aspects is provided, wherein an exhaust gas purifying catalyst is loaded onto at least one of each surface of the partition walls of the honeycomb structure body and each pore of the partition walls.

A plugged honeycomb structure of the present invention includes a honeycomb structure body of a segmented structure. This honeycomb structure body of the segmented structure has outer segments disposed on a circumferential side of the honeycomb structure body and inner segments disposed on an inner side than the outer segments in the cross section. Furthermore, in the plugged honeycomb structure of the present invention, a material constituting the abovementioned outer segments has a smaller heat capacity per unit volume than a material constituting the inner segments. The plugged honeycomb structure of the present invention is suitably usable as a filter to trap particulate matter. Additionally, the abovementioned constitution is employed, so that when the filter is regenerated by burning and removing the particulate matter, the particulate matter hardly remains unburnt in both a circumferential portion and a central portion of the filter, and the number of times to regenerate the filter can be decreased as compared with a conventional plugged honeycomb structure. In addition, when the filter is regenerated, a temperature of the circumferential portion of the filter easily heightens as compared with the conventional plugged honeycomb structure. Therefore, a temperature difference between the circumferential portion and the central portion of the filter is reduced, and hence a thermal shock resistance of the plugged honeycomb structure can be improved.

DETAILED DESCRIPTION OF THE INVENTION

Figure 1:
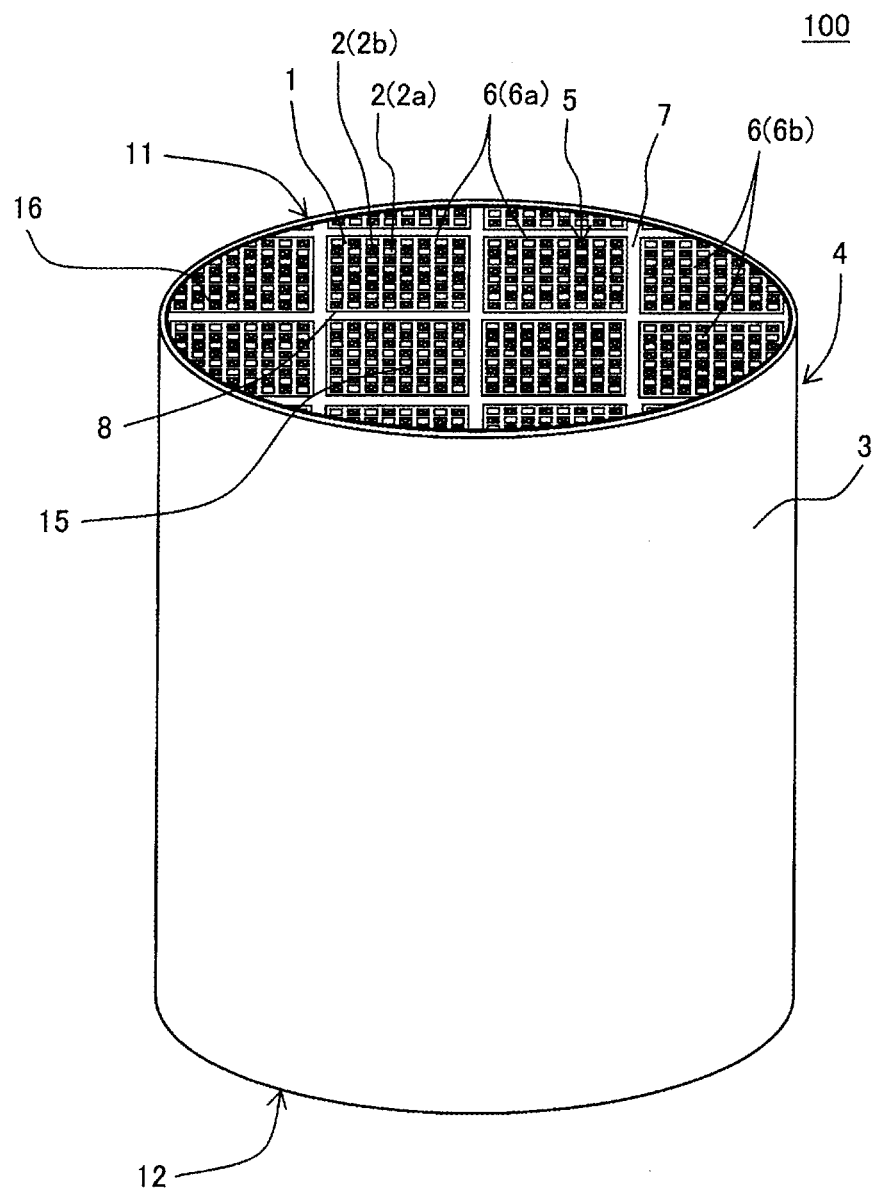
FIG. 1 is a schematic perspective view of one embodiment of a plugged honeycomb structure of the present invention seen from the side of an inflow end face.

Next, a mode for carrying out the present invention will be described in detail with reference to the drawings. It should be understood that the present invention is not limited to the following embodiments and that changes, improvements and the like of design are suitably added on the basis of ordinary knowledge of a person skilled in the art without departing from the gist of the present invention.

One embodiment of a plugged honeycomb structure of the present invention is a plugged honeycomb structure 100 including a tubular honeycomb structure body 4 and plugging portions 5 disposed in open ends of cells 2 as shown in FIG. 1 to FIG. 5. The honeycomb structure body 4 has a plurality of honeycomb segments 6 and a bonding layer 7 to bond the plurality of honeycomb segments 6 to one another so that side surfaces of the honeycomb segments 6 face one another. Each of the honeycomb segments 6 have porous partition walls 1 defining the plurality of cells 2 which become through channels for a fluid and extend from a first end face 11 to a second end face 12. The honeycomb segment 6 shown in FIG. 1 to FIG. 5 further has an outer wall 8 disposed to surround the partition walls 1. The plugging portion 5 is disposed in one of the open ends of each of the plurality of cells 2 to plug the open end of the cells 2. In FIG. 1 to FIG. 5, the plugging portions 5 are disposed in the open ends of predetermined cells 2b (hereinafter also referred to simply as "the cells 2b") in the first end face 11 and the open ends of residual cells 2a (hereinafter also referred to simply as "the cells 2a") in the second end face 12. The plugged honeycomb structure 100 having such a constitution is usable as a particulate filter to purify an exhaust gas discharged from an internal combustion engine or each type of combustion device. The plugged honeycomb structure 100 shown in FIG. 1 to FIG. 5 further has a circumferential wall 3 positioned at an outermost circumference of the honeycomb structure body 4. The honeycomb structure body 4 in which the plurality of honeycomb segments 6 are bonded in a state where the honeycomb segments are disposed adjacent to one another so that side surfaces of the honeycomb segments face each other will hereinafter be referred to as "the honeycomb structure body 4 of a segmented structure" sometimes.

The honeycomb structure body 4 has outer segments 6b and inner segments 6a as the plurality of honeycomb segments 6. The outer segments 6b are the honeycomb segments 6 disposed on a circumferential side of the honeycomb structure body 4 in a cross section vertical to an extending direction of the cells 2. The inner segments 6a are the honeycomb segments 6 disposed on an inner side than the outer segments 6b in the above cross section. Furthermore, in the plugged honeycomb structure 100 of the present embodiment, a material constituting the outer segments 6b has a smaller heat capacity per unit volume than a material constituting the inner segments 6a.

Figure 2:
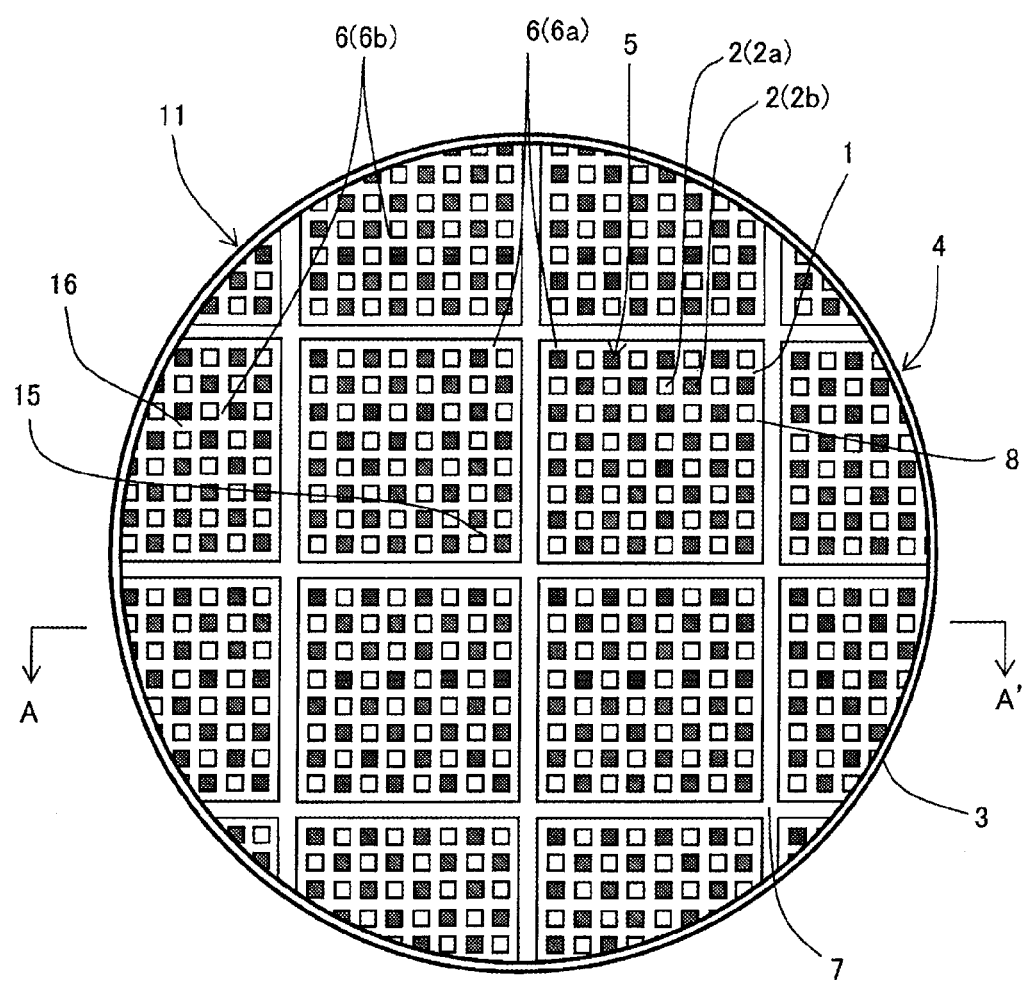
FIG. 2 is a schematic plan view of the plugged honeycomb structure shown in FIG. 1 and seen from the side of the inflow end face.
Figure 3:
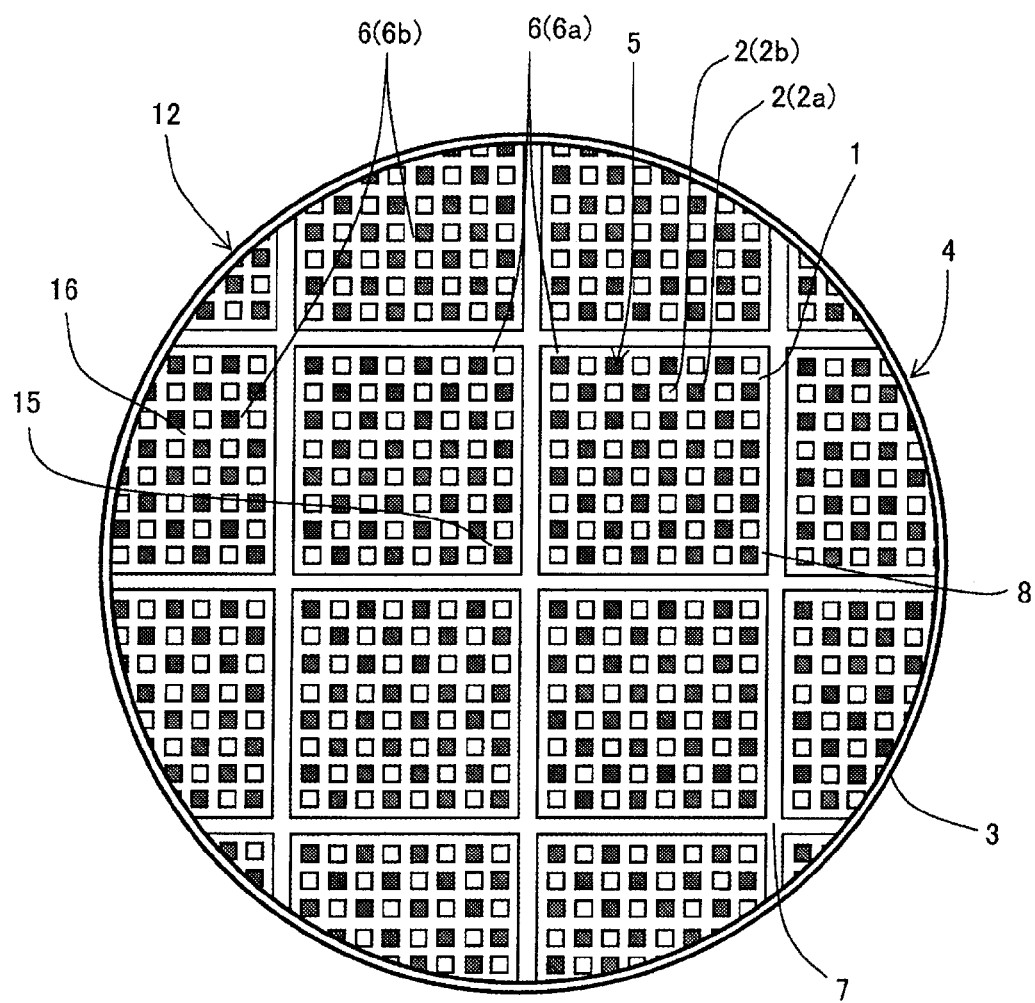
FIG. 3 is a schematic plan view of the plugged honeycomb structure shown in FIG. 1 and seen from the side of an outflow end face.
Figure 4:
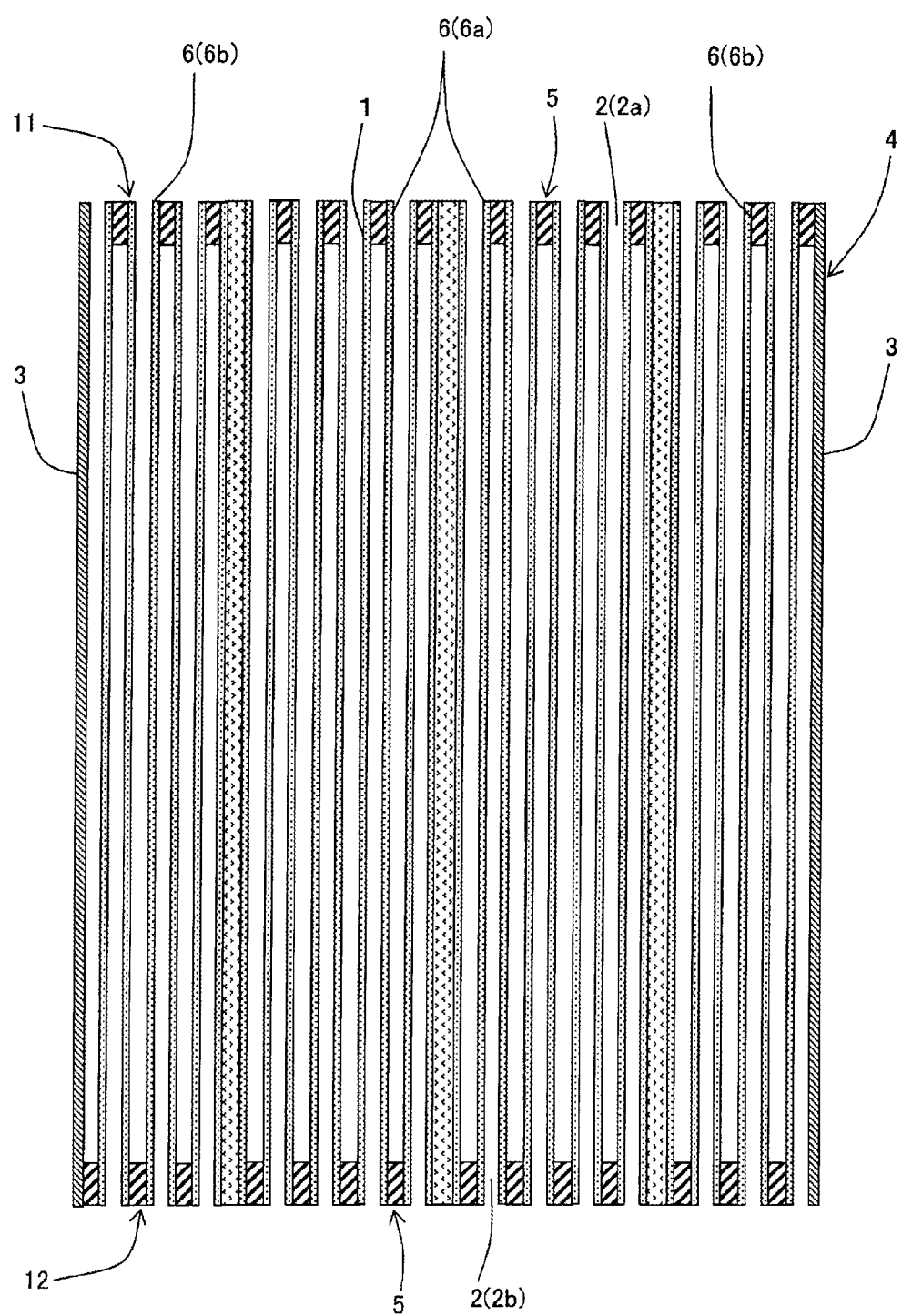
FIG. 4 is a sectional view schematically showing a cross section taken along the A-A' line of FIG. 2.
Figure 5:
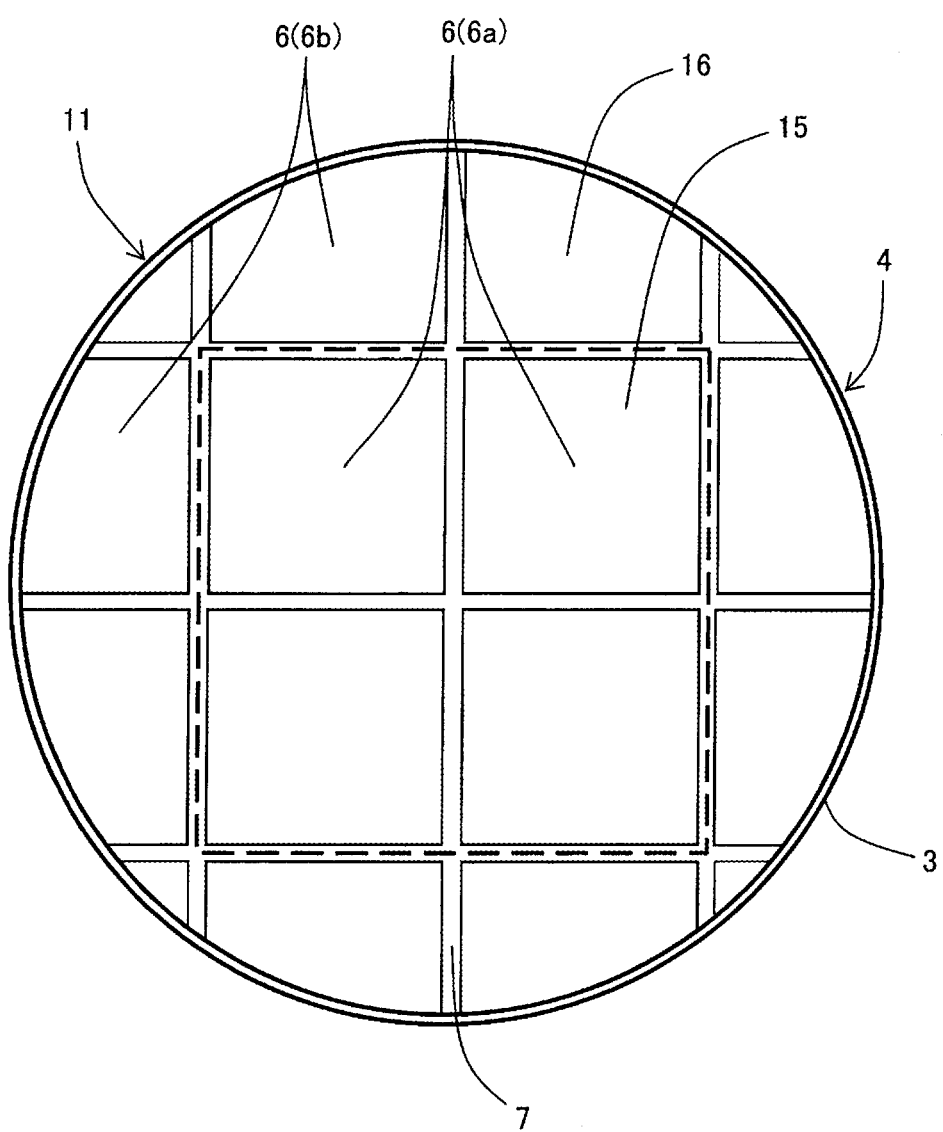
FIG. 5 is a plan view schematically showing the inflow end face of the plugged honeycomb structure shown in FIG. 1.

Here, FIG. 1 is a schematic perspective view of one embodiment of the plugged honeycomb structure of the present invention seen from the side of an inflow end face. FIG. 2 is a schematic plan view of the plugged honeycomb structure shown in FIG. 1 and seen from the side of the inflow end face. FIG. 3 is a schematic plan view of the plugged honeycomb structure shown in FIG. 1 and seen from the side of an outflow end face. FIG. 4 is a sectional view schematically showing a cross section taken along the A-A' line of FIG. 2. FIG. 5 is a plan view schematically showing the inflow end face of the plugged honeycomb structure shown in FIG. 1. In FIG. 5, the partition walls are omitted.

The plugged honeycomb structure 100 of the present embodiment is suitably usable as a filter to trap particulate matter. Additionally, the abovementioned constitution is employed, so that when the filter is regenerated by burning and removing the particulate matter, the particulate matter hardly remains unburnt (i.e., a regeneration efficiency is high) in both a circumferential portion 16 and a central portion 15 of the filter, and the number of times to regenerate the filter can be decreased as compared with a conventional plugged honeycomb structure. In addition, when the filter is regenerated, a temperature of the circumferential portion 16 of the filter easily heightens as compared with the conventional plugged honeycomb structure. Therefore, a temperature difference between the circumferential portion 16 and the central portion 15 of the filter is reduced, and hence a thermal shock resistance of the plugged honeycomb structure 100 can be improved.

The heat capacity per unit volume of the material constituting the outer segments is preferably from 0.60 to 0.95 times, further preferably from 0.70 to 0.90 times, and especially preferably from 0.70 to 0.85 times as large as the heat capacity per unit volume of the material constituting the inner segments. The smaller the heat capacity per unit volume of the material constituting the outer segments is, the higher the regeneration efficiency becomes. On the other hand, when the heat capacity per unit volume of the material constituting the outer segments is small, the highest temperature of the inner segments during the regeneration disadvantageously gradually heightens. When the heat capacity per unit volume of the material constituting the outer segments is set to the abovementioned numeric range, the thermal shock resistance of the plugged honeycomb structure can suitably be improved while suitably reducing a temperature difference between the circumferential portion and the central portion of the filter.

"The heat capacity per unit volume of the material constituting the outer segments" and "the heat capacity per unit volume of the material constituting the inner segments" will hereinafter be referred to generically as "the heat capacity per unit volume of the material constituting the honeycomb segments" sometimes. In the present description, "the heat capacity" is a heat capacity at 600° C. unless otherwise specifically noted. In the present description, a value of each of "the heat capacity" and "the heat capacity per unit volume" is indicated as the heat capacity (J/K/cm$^3$) per 1 cm$^3$ unless otherwise specifically noted.

"The heat capacity per unit volume of the material constituting the honeycomb segments can be measured as follows. A heat capacity (J/K/g) per unit mass of the material constituting the honeycomb segments at 600° C. is measured by using an adiabatic specific heat measurement system manufactured by ULVAC-RICO, Inc. The obtained heat capacity (J/K/g) per unit mass is multiplied by a true density (g/cm$^3$) of the material constituting the honeycomb segments which is measured at room temperature by Archimedes method, to calculate a heat capacity C1 (J/K/cm$^3$) per unit volume of the material constituting the honeycomb segments. To measure the heat capacity, a sample having a predetermined size is cut out from a porous body constituting the partition walls of the honeycomb segments so that the heat capacity can be measured by using the sample prepared as described above.

Here, "the material constituting the honeycomb segments" in the abovementioned "heat capacity (J/K/cm$^3$) per unit volume of the material constituting the honeycomb segments" means a dense material in which any pores or the like are not formed. Therefore, in the present description, "the heat capacity per unit volume of the material" means a heat capacity measured in the dense material in which the pores or the like are not formed. For example, "the heat capacity (J/K/cm$^3$) per unit volume of the material constituting the honeycomb segments" is the heat capacity of the material itself constituting the partition walls of the honeycomb segments, and hence the pores formed in the partition walls of the honeycomb segments are not taken into consideration. Hereinafter, in the present description, the heat capacity in which the pores formed in the partition walls of the honeycomb segments are taken into consideration will be described as "the heat capacity per unit volume of the porous body constituting the partition walls of the honeycomb segments" or "the heat capacity per unit volume of the porous body constituting the partition walls", and distinguished from the abovementioned "heat capacity per unit volume of the material". "The heat capacity per unit volume of the material" is referred to simply as "the heat capacity of the material" sometimes. In addition, "the heat capacity (J/K/cm$^3$) per unit volume of the honeycomb segments" means the heat capacity (J/K/cm$^3$) per unit volume of the honeycomb segments, in which a volume of the honeycomb segments including the cells formed in the honeycomb segments is a denominator.

As to "the heat capacity (J/K/cm$^3$) per unit volume of the porous body constituting the partition walls of the honeycomb segments", a heat capacity C2 (J/K/cm$^3$) per unit volume of the porous body constituting the partition walls is calculated from the abovementioned "heat capacity C1 (J/K/cm$^3$) per unit volume of the material constituting the honeycomb segments" in accordance with the following equation (1). It is to be noted that "a porosity of the porous body" in the following equation (1) can be measured in conformity with JIS R 1634 by the Archimedes method.

$$\text{Heat capacity } C2 = \text{heat capacity } C1 \times (100-p)/100 \qquad (1),$$

in which p is the porosity (%) of the porous body.

A pressure loss of the outer segments is preferably from 0.90 to 1.10 times, further preferably from 0.90 to 1.05 times, and especially preferably from 0.95 to 1.05 times as large as a pressure loss of the inner segments. When the pressure loss of the outer segments deviates from the abovementioned numeric range, the particulate matter is disadvantageously unevenly accumulated sometimes in a case where the plugged honeycomb structure is used as the filter to trap the particulate matter. Therefore, it becomes difficult to control the regeneration during the regeneration of the filter. Here, "the regeneration control" is the control of a temperature rise of each portion due to burning heat of soot during the regeneration of the filter.

The porous body constituting each of the outer segments has a higher thermal conductivity than the porous body constituting each of the inner segments. In such a constitution, when the plugged honeycomb structure is used as the filter, the regeneration efficiency further heightens. The thermal conductivity can be measured by a laser flash method and the like.

The porous body constituting each of the outer segments preferably has a larger thermal expansion coefficient than the porous body constituting each of the inner segments. According to such a constitution, when the plugged honeycomb structure is used as the filter, generation of cracks during the regeneration can effectively be inhibited. The thermal expansion coefficient of the outer segment is preferably from 1.20 to 1.60 times, further preferably from 1.40 to 1.60 times, and especially preferably from 1.40 to 1.50 times as large as the thermal expansion coefficient of the inner segment. An effect of inhibiting the generation of the cracks during the regeneration is not easily obtained, when the thermal expansion coefficient is not sufficiently large. However, when the thermal expansion coefficient of the outer segment is excessively large, the cracks are noticeably generated again.

There is not any special restriction on the material of the outer segments and the material of the inner segments. However, as hitherto described, in the plugged honeycomb structure of the present embodiment, the heat capacity per unit volume of the material constituting the outer segments is smaller than the heat capacity per unit volume of the material constituting the inner segments. Therefore, each type of material is preferably selected in consideration of the heat capacity of each of the materials of the outer segments and the inner segments. For example, the inner segments may be constituted of either a material including aluminum titanate or a material including aluminum titanate and α-Al$_2$O$_3$. The material including aluminum titanate or the material including aluminum titanate and α-Al$_2$O$_3$ has a relatively large heat capacity as compared with a material for use in honeycomb segments of a heretofore known plugged honeycomb structure. Therefore, when the inner segments are constituted of the abovementioned material, the temperature rise of the inner segments can effectively be inhibited. Furthermore, the outer segments may be constituted of SiC, Si, Si$_3$N$_4$, cordierite, mullite, or a material including at least two of these materials. As to the outer segments constituted of such a material, the heat capacity per unit volume of the material constituting the outer segments easily becomes smaller than the heat capacity per unit volume of the material constituting the inner segments.

The heat capacity of the material constituting the inner segments at 600° C. (i.e., "the heat capacity C1" in the above equation (1)) is preferably from 3.80 to 4.50 J/K/cm$^3$, further preferably from 4.25 to 4.50 J/K/cm$^3$, and especially preferably from 4.30 to 4.50 J/K/cm$^3$. When the heat capacity of the material constituting the inner segments is in the above numeric range, the temperature rise of the inner segments can effectively be inhibited.

In the cross section of the honeycomb structure body which is vertical to the cell extending direction, an area ratio of the inner segments to the outer segments is preferably from 70/30 to 10/90, further preferably from 60/40 to 20/80, and especially preferably from 50/50 to 20/80. Hereinafter, "the area ratio of the inner segments to the outer segments in the cross section of the honeycomb structure body which is vertical to the cell extending direction" will be referred to simply as "the area ratio of the inner segments to the outer segments" sometimes. When the area ratio of the inner segments to the outer segments is in the above numeric range, the particulate matter more hardly remains unburnt in both the circumferential portion and the central portion of the filter during the regeneration performed by burning and removing the particulate matter. An area of the inner segments and an area of the outer segments can be obtained as follows. First, among the plurality of honeycomb segments, the inner segments are distinguished from the outer segments (i.e., each boundary between the inner segment and the outer segment is distinguished). The inner segments are distinguished from the outer segments by measuring the heat capacity of the material constituting each honeycomb segment. Next, the area of each honeycomb segment is obtained and the area ratio of the inner segments to the outer segments is calculated. It is to be noted that areas of the bonding layer and the circumferential wall are not included in the area of the honeycomb segments, and a region surrounded by the bonding layer and the circumferential wall is the area of the respective honeycomb segments.

In the cross section of the honeycomb structure body which is vertical to the cell extending direction, the inner segments and the outer segments are preferably linearly symmetrically disposed. According to such a constitution, when the filter is regenerated by burning and removing the particulate matter, the particulate matter more hardly remains unburnt in both the circumferential portion and the central portion of the filter. For example, when the inner segments and the outer segments are asymmetrically disposed in the above cross section, an effect of reducing the temperature difference between the circumferential portion and the central portion in the above cross section is hard to obtain sometimes.

A porosity of the porous body constituting each honeycomb segment is preferably from 20 to 50%, further preferably from 25 to 50%, and especially preferably from 25 to 45%. When the porosity of the porous body constituting the honeycomb segment is smaller than 20%, a pressure loss of the plugged honeycomb structure enlarges sometimes. When the porosity of the porous body constituting the honeycomb segment is in excess of 50%, the partition walls of the plugged honeycomb structure become brittle and easily lacking sometimes. Furthermore, when the porosity of the porous body is excessively high, the heat capacity of the porous body becomes smaller, and hence the temperature of the plugged honeycomb structure easily rises sometimes. The porosity of the porous body constituting the honeycomb segment is the porosity of the partition walls of the honeycomb segment. The porosity of the porous body constituting the honeycomb segment can be measured in conformity with JIS R 1634 by the Archimedes method. The porosity of the porous body constituting each inner segment may have the same value as the porosity of the porous body constituting each outer segment or a different value therefrom.

An average pore diameter of the porous body constituting each honeycomb segment is preferably from 5 to 20 µm, further preferably from 8 to 15 µm, and especially preferably from 8 to 12 µm. When the average pore diameter of the porous body constituting the honeycomb segment is smaller than 5 µm, the pressure loss of the plugged honeycomb structure enlarges sometimes. When the average pore diameter of the porous body constituting the honeycomb segment is in excess of 20 µm and when the plugged honeycomb structure is used as a filter such as the DPF, a part of the PM in the exhaust gas passes through the partition walls and hence a trapping efficiency of the filter deteriorates sometimes. The average pore diameter of the porous body can be measured in conformity with JIS R 1655 by mercury porosimetry. The average pore diameter of the porous body constituting each inner segment may have the same value as the average pore diameter of the porous body constituting each outer segment or a different value therefrom.

There is not any special restriction on a thickness of the partition walls of each honeycomb segment, but the thickness is preferably from 100 to 500 µm, further preferably from 150 to 400 µm, and especially preferably from 150 to 300 µm. When the thickness of the partition walls is in such a range, a rise of the pressure loss can be inhibited while keeping a strength of the partition walls of the plugged honeycomb structure. The thickness of the partition walls of the inner segments may have the same value as the thickness of the partition walls of the outer segments or a different value therefrom.

There is not any special restriction on a cell density of each honeycomb segment, but the cell density is preferably from 15 to 100 cells/cm$^2$, further preferably from 30 to 65 cells/cm$^2$, and especially preferably from 30 to 50 cells/cm$^2$. When the cell density is in such a range and when the plugged honeycomb structure is used as the DPF or the like, the trapping efficiency can be improved while inhibiting the pressure loss. The cell density of the inner segments may have the same value as the cell density of the outer segments or a different value therefrom.

There is not any special restriction on a shape of each cell formed in each honeycomb segment. Here, "the cell shape" is the shape of the cells in a cross section of the honeycomb segment which is perpendicular to the cell extending direction. Examples of the cell shape include a quadrangular shape, a hexagonal shape, an octagonal shape, and any combination of these shapes. The shape of each cell formed in the inner segments may be the same as the shape of each cell formed in the outer segments, or different therefrom.

Here, in the plugged honeycomb structure of the present embodiment, the inner segments and the outer segments may have the same partition wall thickness, cell density and cell shape. That is, the inner segments and the outer segments preferably do not have any difference in a geometric constitution such as the partition wall thickness, the cell density or the cell shape, and preferably have a different heat capacity per unit volume due to a difference between the materials. When the segments "do not have any difference in the geometric constitution", it is meant that the geometric constitution intentionally is not provided with any change during the preparation of the inner segments and the outer segments. Therefore, unintended deformation in the process of the preparation, a minor difference between manufacturing lots, an individual difference of each honeycomb segment and the like are not included in the difference in the geometric constitution. Furthermore, the geometric difference between the inner segment and the outer segment which is made by grinding performed to form the whole shape of the honeycomb structure body into a desirable shape is not included in the abovementioned "difference in the geometric constitution".

There is not any special restriction on a shape of the honeycomb structure body, and examples of the shape include a pillar shape (a columnar shape) in which a bottom surface is circular, a pillar shape in which a bottom surface is oval, and a pillar shape in which a bottom surface has a polygonal shape (a quadrangular shape, a pentangular shape, a hexagonal shape, a heptagonal shape, an octagonal shape or the like).

A length from the first end face to the second end face of the honeycomb structure body and a size of the cross section of the honeycomb structure body which is perpendicular to the cell extending direction may suitably be selected so that an optimum purification performance can be obtained when the plugged honeycomb structure of the present embodiment is used as an exhaust gas purifying filter. For example, the length from the first end face to the second end face of the honeycomb structure body is preferably from 100 to 500 mm and further preferably from 100 to 300 mm. An area of the cross section of the honeycomb structure body which is perpendicular to the cell extending direction is preferably from 7000 to 70000 mm$^2$ and further preferably from 7000 to 30000 mm$^2$.

The exhaust gas purifying catalyst may be loaded onto at least one of each surface of the partition walls of the honeycomb structure body and each pore of the partition walls. An example of the catalyst is a platinum group metal loaded onto porous γ-Al$_2$O$_3$. It is to be noted that the catalyst loaded onto the partition walls of the honeycomb structure body is a constitutional element different from the partition walls (i.e., the porous body), and hence the hitherto described "material constituting the honeycomb segments" does not include this catalyst.

Next, a manufacturing method of the plugged honeycomb structure of the present embodiment will be described. When the plugged honeycomb structure of the present embodiment is manufactured, two types are prepared, i.e., a first forming raw material to prepare the inner segments and a second forming raw material to prepare the outer segments are prepared. Furthermore, as the second forming raw material, a raw material is selected so that a heat capacity per unit volume of the material obtained by firing the second forming raw material is lower than a heat capacity per unit volume of the material obtained by firing the first forming raw material. The first forming raw material can be prepared by blending, for example, desirable amounts of $Al_2O_3$, $TiO_2$, talc, mica and clay. The second forming raw material can be prepared by blending SiC, Si, $Si_3N_4$, cordierite, mullite and the like. Additionally, to the first forming raw material and the second forming raw material, a dispersing medium or an additive may further be added in addition to the abovementioned raw materials.

Examples of the additive include a binder and a pore former. An example of the dispersing medium is water.

Examples of the binder include methylcellulose, hydroxypropoxyl cellulose, hydroxyethyl cellulose, carboxymethylcellulose, and polyvinyl alcohol. There is not any special restriction on the pore former, as long as the pore former becomes pores after fired, and examples of the pore former include starch, a foamable resin, a water absorbable resin, and silica gel.

Next, the obtained first forming raw material is kneaded to form a first kneaded material. Furthermore, the obtained second forming raw material is kneaded to form a second kneaded material. There is not any special restriction on a method of forming the first kneaded material and the second kneaded material, and an example of the method is a method in which a kneader, a vacuum pugmill or the like is used.

Next, the obtained first kneaded material is extruded to prepare a first honeycomb segment formed body. Furthermore, the obtained second kneaded material is extruded to prepare a second honeycomb segment formed body. The first honeycomb segment formed body is the formed body which becomes the inner segment, and the second honeycomb segment formed body is the formed body which becomes the outer segment. A preparing method of the first honeycomb segment formed body and the second honeycomb segment formed body can be performed in conformity with a heretofore known manufacturing method of the plugged honeycomb structure of the segmented structure. The extrusion can be performed by using a die having a desirable cell shape, partition wall thickness and cell density.

Next, the obtained first honeycomb segment formed body and second honeycomb segment formed body may be dried. There is not any special restriction on a drying method, but examples of the method include hot air drying, microwave drying, dielectric drying, reduced-pressure drying, vacuum drying, and freeze drying. Among these methods, the dielectric drying, the microwave drying or the hot air drying is preferably performed alone or any combination thereof is preferably performed. Furthermore, as drying conditions, a drying temperature is preferably set to 30 to 150° C. and a drying time is preferably set to one minute to two hours.

Next, open ends of cells of the obtained first honeycomb segment formed body (or dried body) and second honeycomb segment formed body (or dried body) are plugged by a plugging material. An example of a method of plugging the open ends of the cells is a method in which the plugging material is charged into the open ends of the cells. The method of charging the plugging material can be performed in conformity with the heretofore known manufacturing method of the plugged honeycomb structure. There is not any special restriction on a ceramic raw material to form the plugging material. Between the plugging material for use in the first honeycomb segment formed body (hereinafter also referred to as "a first plugging material") and the plugging material for use in the second honeycomb segment formed body (hereinafter also referred to as "a second plugging material", ceramic raw materials to form the respective plugging materials may be different. As the ceramic raw material of the first plugging material, the first forming raw material used in the preparation of the first honeycomb segment formed body is preferably used. As the ceramic raw material of the second plugging material, the second forming raw material used in the preparation of the second honeycomb segment formed body is preferably used. For the purpose of adjusting a porosity, pore diameters and the like of plugging portions formed by using the plugging material, there may suitably be changed particle diameters and a blending amount of powder of the ceramic raw material as well as particle diameters and a blending amount of powder of a pore former to be added.

Next, the first honeycomb segment formed body (or dried body) and the second honeycomb segment formed body (or dried body) in which the plugging material is charged into the open ends of the cells are fired. In consequence, there are prepared each inner segment which is a fired body of the first honeycomb segment formed body and each outer segment which is a fired body of the second honeycomb segment formed body. A firing temperature, a firing time and a firing atmosphere can suitably be selected in accordance with the materials of the first forming raw material and the second forming raw material. The firing can be performed in, for example, an air atmosphere, a steam atmosphere, a hydrocarbon gas combustion atmosphere, an argon atmosphere, or a nitrogen atmosphere.

Next, a bonding material to form the bonding layer which bonds the inner segments and the outer segments is prepared. The bonding material can be prepared in conformity with the heretofore known manufacturing method of the plugged honeycomb structure of the segmented structure.

Next, the plurality of inner segments and outer segments are assembled in a predetermined shape while bonding side surfaces of the segments to one another by using the bonding material to prepare a bonded body of the honeycomb segments. In this case, the outer segments are disposed on a circumferential side of the bonded body in a cross section of the bonded body of the honeycomb segments which is vertical to the cell extending direction, and the inner segments are disposed on an inner side than the outer segments in the above cross section. The bonded body of the honeycomb segments is prepared and then the bonded body of the honeycomb segments may be dried.

Next, a circumferential portion of the obtained bonded body may be ground into a predetermined shape. Furthermore, when the circumferential wall is formed in the circumferential portion of the bonded body, a circumferential coating material is first applied to a circumferential surface of the obtained bonded body or the ground bonded body to form a precursor of the circumferential wall. Then, the obtained precursor of the circumferential wall is dried or fired to form the circumferential wall. The circumferential coating material can be prepared in conformity with the heretofore known manufacturing method of the plugged honeycomb structure of the segmented structure.

As described above, the plugged honeycomb structure of the present embodiment can be manufactured. However, the manufacturing method of the plugged honeycomb structure of the present embodiment is not limited to the abovementioned manufacturing method.

EXAMPLES

Hereinafter, the present invention will further specifically be described in accordance with examples, but the present invention is not limited to these examples.

In each example described as follows, seven types of honeycomb segments shown in Table 1 were prepared, and inner segments and outer segments were selected from the seven types of honeycomb segments to prepare a plugged honeycomb structure. 1 to 7 of a column of "honeycomb segment No." of Table 1 are numbers attached to the respective honeycomb segments in the present example. Hereinafter, the respective honeycomb segments shown in "1 to 7" of the column of "the honeycomb segment No." of Table 1 will be "the honeycomb segments 1 to 7". That is, the honeycomb segment shown in "1" of the column of "honeycomb segment No." of Table 1 is "the honeycomb segment 1". Hereinafter, a manufacturing method of the honeycomb segments 1 to 7 will be described.

then the hot air drying was performed to form plugging portions in the open ends of the cells. The plugging material was prepared by adding an appropriate amount of water to powder obtained by mixing 3750 g of $\alpha$-$Al_2O_3$ powder, 750 g of $TiO_2$ powder, 350 g of talc powder, 150 g of mica powder, 500 g of starch, and 10 g of methylcellulose, followed by the kneading with a mixer.

Next, the honeycomb segment dried body in which the plugging portions were formed was degreased. The degreasing was performed at 450° C. in the air atmosphere for five hours. Next, the degreased honeycomb segment dried body was fired to obtain the honeycomb segment 1. The firing was performed at 1500° C. in the air atmosphere for four hours.

(Honeycomb Segment 2)

The honeycomb segment 2 was prepared in the same manner as in the honeycomb segment 1, except that a forming raw material and a plugging material were prepared by methods described as follows. The forming raw material in the honeycomb segment 2 was prepared by adding an appropriate amount of water to powder obtained by mixing 3500 g of $\alpha$-$Al_2O_3$ powder, 1000 g of $TiO_2$ powder, 350 g

TABLE 1

| Honeycomb segment No. | Material | Porosity (%) | Ave. pore dia. (μm) | True density (g/cm$^3$) | Heat capacity C1 (J/K/cm$^3$) | Heat capacity C2 (J/K/cm$^3$) | Thermal conductivity (W/m/K) | Thermal expansion coefficient (ppm/K) | Pressure loss (kPa) |
|---|---|---|---|---|---|---|---|---|---|
| 1 | Aluminum titanate/$\alpha$-$Al_2O_3$ | 39 | 10 | 3.76 | 4.41 | 2.69 | 1 | 4.5 | 6.3 |
| 2 | Aluminum titanate/$\alpha$-$Al_2O_3$ | 39 | 10 | 3.73 | 4.32 | 2.64 | 1 | 3.1 | 6.3 |
| 3 | SiC | 39 | 9 | 3.22 | 3.76 | 2.29 | 52 | 4.5 | 6.5 |
| 4 | $Si_3N_4$/SiC | 39 | 9 | 3.28 | 3.74 | 2.28 | 25 | 3.9 | 6.7 |
| 5 | Si/SiC/cordierite/mullite | 39 | 10 | 2.83 | 3.10 | 1.89 | 37 | 4.6 | 6.2 |
| 6 | Aluminum titanate | 45 | 9 | 3.54 | 3.84 | 2.11 | 1 | 0.5 | 5.3 |
| 7 | Cordierite | 45 | 12 | 2.52 | 3.19 | 1.75 | 1 | 0.5 | 5.0 |

(Honeycomb Segment 1)

First, an appropriate amount of water was added to powder obtained by mixing 3750 g of $\alpha$-$Al_2O_3$ powder, 750 g of $TiO_2$ powder, 350 g of talc powder, 150 g of mica powder, 500 g of starch, and 200 g of methylcellulose, to prepare a forming raw material. An average particle diameter of the $\alpha$-$Al_2O_3$ powder was 32 μm. An average particle diameter of the $TiO_2$ powder was 0.4 μm. An average particle diameter of the talc powder was 3 μm. An average particle diameter of the mica powder was 42 μm.

Next, the obtained forming raw material was kneaded with a kneader and then kneaded with a vacuum pugmill to form a kneaded material. Next, the obtained kneaded material was extruded to prepare a honeycomb segment formed body. In the honeycomb segment formed body after fired, a partition wall thickness was 300 μm and a cell density was 46.5 cells/cm$^2$. A shape of each cell of the honeycomb segment formed body became square after the firing. Furthermore, the honeycomb segment formed body was a quadrangular prismatic (quadrangular pillar-shaped) body having square end faces. A length of one side of each end face of the quadrangular prismatic honeycomb segment formed body was 35 mm after the firing.

Next, the honeycomb segment formed body was dried to obtain a honeycomb segment dried body. In the drying, microwave drying was first performed and then hot air drying was performed. Afterward, the honeycomb segment dried body was cut so that a length of the dried body from one end face to the other end face was 150 mm after the firing.

Next, a plugging material was charged into open ends of cells of the obtained honeycomb segment dried body, and of talc powder, 150 g of mica powder, 450 g of starch, and 200 g of methylcellulose. The plugging material in the honeycomb segment 2 was prepared by adding an appropriate amount of water to powder obtained by mixing 3500 g of $\alpha$-$Al_2O_3$ powder, 1000 g of $TiO_2$ powder, 350 g of talc powder, 150 g of mica powder, 500 g of starch, and 10 g of methylcellulose, followed by kneading with a mixer. Average particle diameters of the respective raw material powders of the forming raw material and the plugging material were as follows. The average particle diameter of the $\alpha$-$Al_2O_3$ powder was 32 μm. The average particle diameter of the $TiO_2$ powder was 0.4 μm. The average particle diameter of the talc powder was 3 μm. The average particle diameter of the mica powder was 42 μm.

(Honeycomb Segment 3)

The honeycomb segment 3 was prepared in the same manner as in the honeycomb segment 1, except that a forming raw material and a plugging material were prepared by methods described as follows and except that firing was performed at 2200° C. in an argon atmosphere for two hours. The forming raw material in the honeycomb segment 3 was prepared by adding an appropriate amount of water to powder obtained by mixing 3000 g of $\alpha$-SiC powder having an average particle diameter of 12 μm, 2000 g of $\alpha$-SiC powder having an average particle diameter of 2 μm, and 300 g of methylcellulose. The plugging material was prepared by adding an appropriate amount of water to powder obtained by mixing 3000 g of $\alpha$-SiC powder having an average particle diameter of 12 μm, 2000 g of $\alpha$-SiC powder having an average particle diameter of 2 μm, 500 g of starch, and 10 g of methylcellulose, followed by kneading with a mixer.

(Honeycomb Segment 4)

The honeycomb segment 4 was prepared in the same manner as in the honeycomb segment 1, except that a forming raw material and a plugging material were prepared by methods described as follows and except that firing was performed at 1450° C. in an argon atmosphere for two hours, and then a temperature was not lowered, but the atmosphere was changed to nitrogen to perform the firing for ten hours. The forming raw material in the honeycomb segment 4 was prepared by adding an appropriate amount of water to powder obtained by mixing 4000 g of α-SiC powder, 1000 g of Si powder, 50 g of $SrCO_3$ powder, 30 g of $Al(OH)_3$ powder, 50 g of clay, 100 g of starch, and 300 g of methylcellulose. The plugging material was prepared by adding an appropriate amount of water to powder obtained by mixing 4000 g of α-SiC powder, 1000 g of Si powder, 50 g of $SrCO_3$ powder, 30 g of $Al(OH)_3$ powder, 50 g of clay, 500 g of starch, and 10 g of methylcellulose, followed by kneading with a mixer. An average particle diameter of the α-SiC powder was 25 μm. An average particle diameter of the Si powder was 5 μm. An average particle diameter of the $SrCO_3$ powder was 1 μm. An average particle diameter of the $Al(OH)_3$ powder was 1 μm.

(Honeycomb Segment 5)

The honeycomb segment 5 was prepared in the same manner as in the honeycomb segment 1, except that a forming raw material and a plugging material were prepared by methods described as follows and except that firing was performed at 1450° C. in an argon atmosphere for two hours and then a heat treatment was performed at 1250° C. in the air atmosphere for five hours. The forming raw material in the honeycomb segment 5 was prepared by adding an appropriate amount of water to powder obtained by mixing 3500 g of α-SiC powder, 1500 g of Si powder, 85 g of talc powder, 130 g of kaolin powder, 70 g of α-$Al_2O_3$, 50 g of clay, 200 g of starch, and 300 g of methylcellulose. The plugging material was prepared by adding an appropriate amount of water to powder obtained by mixing 3500 g of α-SiC powder, 1500 g of Si powder, 85 g of talc powder, 130 g of kaolin powder, 70 g of α-$Al_2O_3$ powder, 50 g of clay, 500 g of starch, and 10 g of methylcellulose, followed by kneading with a mixer. An average particle diameter of the α-SiC powder was 25 μm. An average particle diameter of the Si powder was 5 μm. An average particle diameter of the talc powder was 24 μm. An average particle diameter of the kaolin powder was 3 μm. An average particle diameter of the α-$Al_2O_3$ powder was 5 μm.

(Honeycomb Segment 6)

The honeycomb segment 6 was prepared in the same manner as in the honeycomb segment 1, except that a forming raw material and a plugging material were prepared by methods described as follows. The forming raw material in the honeycomb segment 6 was prepared by adding an appropriate amount of water to powder obtained by mixing 2550 g of α-$Al_2O_3$ powder, 1950 g of $TiO_2$ powder, 350 g of talc powder, 150 g of mica powder, 50 g of starch, and 200 g of methylcellulose. The plugging material was prepared by adding an appropriate amount of water to powder obtained by mixing 2550 g of α-$Al_2O_3$ powder, 1950 g of $TiO_2$ powder, 350 g of talc powder, 150 g of mica powder, 500 g of starch, and 10 g of methylcellulose, followed by kneading with a mixer. An average particle diameter of the α-$Al_2O_3$ powder was 32 μm. An average particle diameter of the $TiO_2$ powder was 0.4 μm. An average particle diameter of the talc powder was 3 μm. An average particle diameter of the mica powder was 42 μm.

(Honeycomb Segment 7)

The honeycomb segment 7 was prepared in the same manner as in the honeycomb segment 1, except that a forming raw material and a plugging material were prepared by methods described as follows and except that firing was performed at 1420° C. for four hours. The forming raw material in the honeycomb segment 7 was prepared by adding an appropriate amount of water to powder obtained by mixing 1110 g of kaolin powder, 2135 g of talc powder, 1210 g of α-$Al_2O_3$ powder, 540 g of $SiO_2$ powder, 100 g of starch, and 200 g of methylcellulose. The plugging material was prepared by adding an appropriate amount of water to powder obtained by mixing 1110 g of kaolin powder, 2135 g of talc powder, 1210 g of α-$Al_2O_3$ powder, 540 g of $SiO_2$ powder, 500 g of starch, and 10 g of methylcellulose, followed by kneading with a mixer. An average particle diameter of the kaolin powder was 3 μm. An average particle diameter of the talc powder was 24 μm. An average particle diameter of the α-$Al_2O_3$ powder was 6 μm. An average particle diameter of the $SiO_2$ powder was 21 μm.

Table 1 shows "materials" of the honeycomb segments 1 to 7. Furthermore, as to each of the honeycomb segments 1 to 7, a porosity, an average pore diameter, a true density, a heat capacity C1, a heat capacity C2, a thermal conductivity, a thermal expansion coefficient and a pressure loss were measured by the following methods. Table 1 shows values of "the porosity (%)", "the average pore diameter (μm)", "the true density (g/cm$^3$)", "the heat capacity C1 (J/K/cm$^3$)", "the heat capacity C2 (J/K/cm$^3$)", "the thermal conductivity (W/m/K)", "the thermal expansion coefficient (ppm/K)" and "the pressure loss (kPa)".

The porosity (%) and the true density (g/cm$^3$) were measured by Archimedes method (JIS R 1634). The average pore diameter (μm) was measured by mercury porosimetry (JIS R 1655).

The heat capacity C1 (J/K/cm$^3$) indicates the heat capacity C1 (J/K/cm$^3$) per unit volume of the material constituting each of the honeycomb segments 1 to 7 (the material constituting partition walls of each of the honeycomb segments 1 to 7). The heat capacity C1 (J/K/cm$^3$) was measured by the following method. First, a heat capacity (J/K/g) per unit mass of the material constituting each of the honeycomb segments 1 to 7 at 600° C. was measured by using an adiabatic specific heat measurement system manufactured by ULVAC-RICO, Inc. Next, the obtained heat capacity (J/K/g) per unit mass was multiplied by a true density (g/cm$^3$) of the material constituting the partition walls of each of the honeycomb segments 1 to 7, to calculate the heat capacity C1 (J/K/cm$^3$) per unit volume of the material constituting the honeycomb segment. "The true density (g/cm$^3$) of the material constituting the partition walls of each of the honeycomb segments 1 to 7" was measured at room temperature by the Archimedes method.

The heat capacity C2 (J/K/cm$^3$) indicates the heat capacity (J/K/cm$^3$) per unit volume of a porous body constituting the partition walls of each of the honeycomb segments 1 to 7. The heat capacity C2 (J/K/cm$^3$) was calculated by the following equation (2).

$$\text{Heat capacity } C2 = \text{heat capacity } C1 \times (100-p)/100 \qquad (2),$$

in which the heat capacity C1 is the heat capacity (J/K/cm$^3$) per unit volume of the material constituting each honeycomb segment and p is the porosity (%) of the porous body constituting the partition walls of each of the honeycomb segments 1 to 7.

The thermal conductivity (W/m/K) was measured by the following method. First, a thermal diffusivity (cm$^2$/sec) was measured at room temperature by a laser flash method. Furthermore, a heat capacity (J/K/g) per unit mass was separately measured at room temperature with a differential scanning calorimeter (DSC). Additionally, a bulk density (g/cm³) was separately measured at room temperature by Archimedes method. Then, the obtained thermal diffusivity (cm²/sec), heat capacity (J/K/g) and bulk density (g/cm³) were multiplied (the thermal diffusivity×the heat capacity× the bulk density) to calculate a thermal conductivity. A thermal expansion coefficient (ppm/K) was obtained by measuring an average coefficient of thermal expansion (CTE) at 40 to 800° C. with a differential detection type thermal dilatometer. A pressure loss (kPa) was obtained by measuring a difference between a pressure of air on an inlet side and a pressure of the air on an outlet side of the honeycomb segment when the air was passed through the honeycomb segment at room temperature and at a constant flow rate. The pressure of the air on the inlet side of the honeycomb segment is, for example, a pressure of air on the side of a first end face of the honeycomb segment, and the pressure of the air on the outlet side of the honeycomb segment is, for example, a pressure of air on the side of a second end face of the honeycomb segment.

Example 1

Figure 6A:
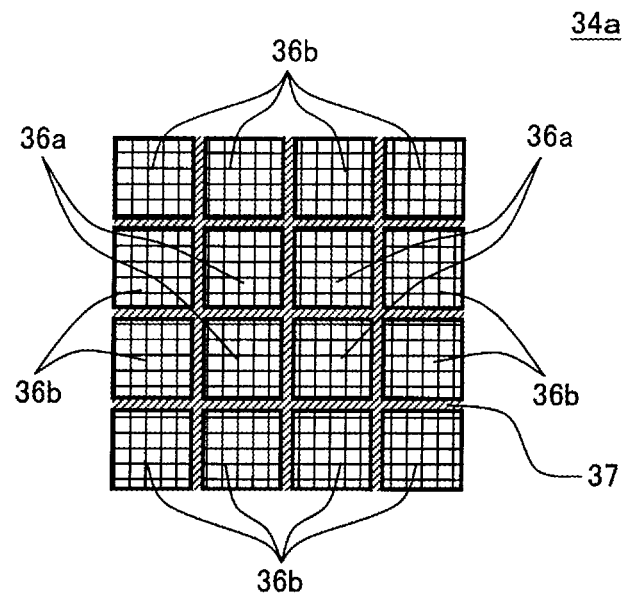
FIG. 6A is a plan view schematically showing an end face of a bonded body of honeycomb segments of Example 1.

In Example 1, first, as shown in FIG. 6A, four honeycomb segments 1 shown in Table 1 were used as inner segments 36a and 12 honeycomb segments 3 shown in Table 1 were used as outer segments 36b to prepare a bonded body 34a of the honeycomb segments. FIG. 6A is a plan view schematically showing an end face of the bonded body of the honeycomb segments of Example 1. In FIG. 6A, in a central portion of the bonded body 34a of the honeycomb segments, the four inner segments 36a are arranged so as to vertically and horizontally dispose every two segments, and the 12 outer segments 36b are disposed at a circumferential portion to surround the inner segments 36a. The inner segments 36a and the outer segments 36b were bonded by using a bonding material prepared as follows. The bonding material was prepared by mixing 1500 g of α-SiC powder, 2000 g of silica sol, 1500 g of ceramic fibers, 50 g of a pore former, 20 g of a binder, and further, an appropriate amount of water. An average particle diameter of the α-SiC powder was 2 μm. Furthermore, the inner segments 36a and the outer segments 36b were bonded by using the bonding material and then hot air drying was performed. Reference numeral 37 in FIG. 6A indicates a bonding layer formed by using the bonding material.

Figure 6B:
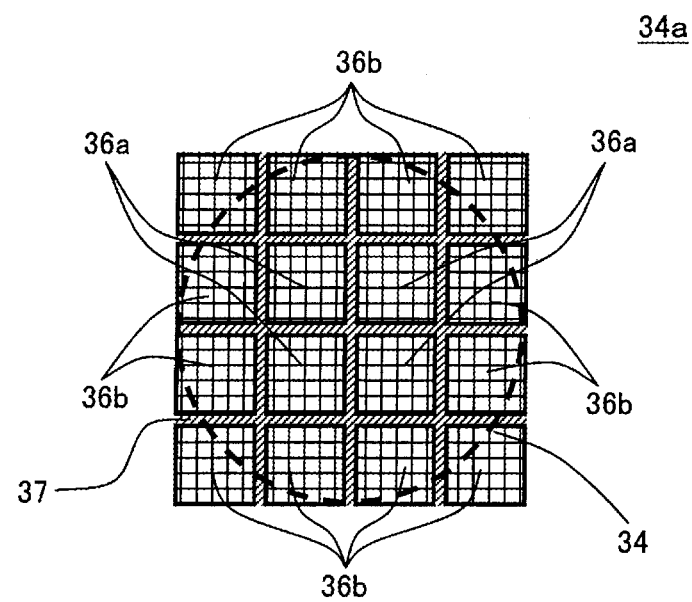
FIG. 6B is a plan view schematically showing the end face of the bonded body of the honeycomb segments of Example 1.

Next, an outer circumference of the bonded body 34a of the honeycomb segments was ground. Specifically, the outside of a circle of the bonded body 34a of the honeycomb segments was ground so as to leave the circle drawn by a broken line in FIG. 6B. By such grinding, a honeycomb structure body 34 of a columnar segmented structure was prepared. FIG. 6B is a plan view schematically showing the end face of the bonded body of the honeycomb segments of Example 1.

Next, a circumferential coating material was applied to a circumferential surface of the obtained honeycomb structure body of the columnar segmented structure to form a precursor of a circumferential wall. The circumferential coating material prepared in the same manner as in the bonding material used in the formation of the bonding layer was used. Afterward, the honeycomb structure body in which the precursor of the circumferential wall was formed was dried with hot air and further fired at 800° C. to manufacture a plugged honeycomb structure of Example 1. In the plugged honeycomb structure of Example 1, an area ratio of the inner segments to the outer segments was 32/68.

Columns of "inner" and "outer" of "used segment" of Table 2 show types of inner segment and outer segment used in the preparation of the plugged honeycomb structure of Example 1. Numeric values described in the columns of "inner" and "outer" of "the used segment" correspond to the numeric values attached to the honeycomb segments 1 to 7 of Table 1.

TABLE 2

| | Used segment | | Characteristic comparison of inner and outer segments | | | | Highest temp. change ratio | Regeneration efficiency change ratio | Temp. diff. change ratio | F value | Cracks |
|---|---|---|---|---|---|---|---|---|---|---|---|
| | Inner | Outer | Heat capacity C1 | Thermal conductivity | Thermal expansion coefficient | Pressure loss | | | | | |
| Comparative Example 1 | 1 | 1 | 1.00 | 1 | 1.00 | 1.00 | 0% | 0% | 0% | 0% | Few |
| Example 1 | 1 | 3 | 0.85 | 52 | 1.00 | 1.03 | 2% | 30% | −36% | 28% | Very few |
| Example 2 | 1 | 4 | 0.85 | 25 | 0.87 | 1.06 | 2% | 23% | −30% | 21% | Few |
| Example 3 | 1 | 5 | 0.70 | 37 | 1.02 | 0.98 | 4% | 42% | −54% | 38% | Very few |
| Comparative Example 2 | 2 | 2 | 1.00 | 1 | 1.00 | 1.00 | 0% | 0% | 0% | 0% | Very few |
| Example 4 | 2 | 3 | 0.87 | 52 | 1.45 | 1.03 | 1% | 27% | −33% | 26% | None |
| Example 5 | 2 | 4 | 0.87 | 25 | 1.26 | 1.06 | 2% | 21% | −27% | 19% | None |
| Example 6 | 2 | 5 | 0.72 | 37 | 1.48 | 0.98 | 4% | 40% | −51% | 36% | None |
| Comparative Example 3 | 6 | 6 | 1.00 | 1 | 1.00 | 1.00 | 0% | 0% | 0% | 0% | None |
| Example 7 | 6 | 7 | 0.83 | 1 | 1.00 | 0.94 | 2% | 20% | −26% | 18% | None |

Columns of "heat capacity C1", "thermal conductivity", "thermal expansion coefficient" and "pressure loss" of "characteristic comparison of inner and outer segments" of Table 2 show the characteristic comparison calculated in accordance with the following equation (3).

Characteristic comparison=characteristic value $A1$ of the outer segment/characteristic value $A2$ of the inner segment    (3), in which the characteristic value $A1$ of the outer segment is a value of the heat capacity C1 (J/K/cm³), the thermal conductivity (W/m/K), the thermal expansion coefficient (ppm/K) or the pressure loss (kPa) of the outer segment, and the characteristic value $A2$ of the inner segment is a value of the heat capacity C1 (J/K/cm³), the thermal conductivity (W/m/K), the thermal expansion coefficient (ppm/K) or the pressure loss (kPa) of the inner segment.

More specifically, a column of "the heat capacity C1" of "the characteristic comparison of the inner and outer segments" of Table 2 shows a value calculated in accordance with the following equation (4).

Characteristic comparison(the heat capacity C1)=the heat capacity C1 of the outer segment/the heat capacity C1 of the inner segment (4)

Furthermore, as to the plugged honeycomb structure of Example 1, "the highest temperature change ratio", "the regeneration efficiency change ratio" and "the temperature difference change ratio" were obtained by the following methods. Table 2 shows the results. A column of "F value" of Table 2 shows a value obtained by subtracting the highest temperature change ratio from the regeneration efficiency change ratio. Hereinafter, the value obtained by subtracting the highest temperature change ratio from the regeneration efficiency change ratio will be referred to simply as the "F value" sometimes. A higher value of the F value indicates that the highest temperature of the plugged honeycomb structure was not raised, but regeneration efficiency was improved.

(Highest Temperature Change Ratio, Regeneration Efficiency Change Ratio, and Temperature Difference Change Ratio)

First, a predetermined amount of soot was deposited in the plugged honeycomb structure, and then regeneration control of the plugged honeycomb structure was conducted. At that time, the highest temperature (° C.) of each of the inner segment and the outer segment was measured. Furthermore, after regeneration, a mass of the plugged honeycomb structure was measured, and regeneration efficiency (%) was calculated in accordance with the following equation (5). It is to be noted that when the regeneration efficiency is high, it is meant that little soot only remains unburnt, and it can be considered that the regeneration efficiency is preferably high for the plugged honeycomb structure.

Regeneration efficiency(%)=(m1−m2)/(m3−m4)×100 (5), in which m1 is a mass of the plugged honeycomb structure prior to the regeneration control, m2 is a mass of the plugged honeycomb structure after the regeneration control, m3 is a mass of the plugged honeycomb structure after the soot is deposited, and m4 is a mass of the plugged honeycomb structure before the soot is deposited. Here, the mass m1 of the plugged honeycomb structure prior to the regeneration control and the mass m3 of the plugged honeycomb structure after the soot is deposited have the same value (i.e., "m1=m3").

In each of Examples 1 to 3, change ratios of the highest temperature and a regeneration efficiency to a plugged honeycomb structure of Comparative Example 1 were obtained as the highest temperature change ratio and the regeneration efficiency change ratio. In each of Examples 4 to 6, change ratios of the highest temperature and a regeneration efficiency to a plugged honeycomb structure of Comparative Example 2 were obtained as the highest temperature change ratio and the regeneration efficiency change ratio. In Example 7, change ratios of the highest temperature and a regeneration efficiency to a plugged honeycomb structure of Comparative Example 3 were obtained as the highest temperature change ratio and the regeneration efficiency change ratio. For example, the highest temperature change ratio and the regeneration efficiency change ratio of the plugged honeycomb structure of Example 1 were calculated in accordance with the following equation (6). It is to be noted that when the regeneration efficiency change ratio is large, it is meant that the regeneration efficiency indicates a high value. Furthermore, when the highest temperature change ratio is small, it is meant that the highest temperature does not heighten (i.e., a temperature rise during the regeneration is inhibited).

Highest temperature change ratio or regeneration efficiency change ratio(%)=(measurement value B1 of the plugged honeycomb structure of Example 1−measurement value B2 of the plugged honeycomb structure of Comparative Example 1)/(the measurement value B2 of the plugged honeycomb structure of Comparative Example 1)×100 (6), in which the measurement value B1 of the plugged honeycomb structure of Example 1 indicates a value of the highest temperature (° C.) or the regeneration efficiency (%) of the plugged honeycomb structure of Example 1, and the measurement value B2 of the plugged honeycomb structure of Comparative Example 1 indicates a value of the highest temperature (° C.) or the regeneration efficiency (%) of the plugged honeycomb structure of Comparative Example 1.

Furthermore, for example, a temperature difference change ratio of the plugged honeycomb structure of Example 1 was calculated in accordance with the following equation (7). When this temperature difference change ratio (%) is small, it is meant that a temperature rise of each inner segment is inhibited and a difference between a temperature of the inner segment and a temperature of an outer segment is reduced.

Temperature difference change ratio(%)=(temperature difference C1 of the plugged honeycomb structure of Example 1−temperature difference C2 of the plugged honeycomb structure of Comparative Example 1)/the temperature difference C2 of the plugged honeycomb structure of Comparative Example 1×100 (7), in which the temperature difference C1 of the plugged honeycomb structure of Example 1 indicates a value (° C.) of a temperature difference (T1−T2) between the highest temperature T1 (° C.) of the inner segment and the highest temperature T2 (° C.) of the outer segment of the plugged honeycomb structure of Example 1, and the temperature difference C2 of the plugged honeycomb structure of Comparative Example 1 indicates a value (° C.) of a temperature difference (T3−T4) between the highest temperature T3 (° C.) of the inner segment and the highest temperature T4 (° C.) of the outer segment of the plugged honeycomb structure of Comparative Example 1.

Furthermore, when the highest temperature change ratio was measured, the regeneration was performed and then the plugged honeycomb structure was observed to confirm an amount of cracks generated. A column of "cracks" of Table 2 shows the result of comparison of the amount of the cracks generated. For the cracks, a circumferential portion of the honeycomb structure was visually observed to measure the number of the cracks and a length of each crack. These results were relatively compared in all the examples and comparative examples and evaluated in three stages of "none", "very few", and "few". The evaluation of "none" indicates that the generation of the cracks cannot visually be confirmed. A frequency of the generation of the cracks increases in order of "none", "very few" and "few".

Examples 2 to 6 and Comparative Examples 1 and 2

The procedures of Example 1 were repeated except that such inner segments and outer segments as shown in Table 2 were used, to manufacture plugged honeycomb structures.

Example 7 and Comparative Example 3

The procedures of Example 1 were repeated except that a bonding material and a circumferential coating material prepared as follows were used, to manufacture plugged honeycomb structures. The bonding material and the circumferential coating material were prepared by mixing 1200 g of cordierite powder, 2000 g of silica sol, 1500 g of ceramic fibers, 50 g of a pore former, 20 g of a binder, and further, an appropriate amount of water. An average particle diameter of the cordierite powder was 2 μm.

Columns of "heat capacity C1", "a thermal conductivity", "a thermal expansion coefficient" and "a pressure loss" of "characteristic comparison of inner and outer segments" of Table 2 show values of "the characteristic comparison of the inner and outer segments" in the plugged honeycomb structure of each of Examples 2 to 7. The value of each characteristic comparison is a value calculated in accordance with the above equation (3). Furthermore, Table 2 also shows a highest temperature change ratio, a regeneration efficiency change ratio, a temperature difference change ratio, a value of "F value", and the confirmation result of the amount of the cracks generated.

CONCLUSION

In a plugged honeycomb structure of each of Examples 1 to 7, a value of "F value" which was a value obtained by subtracting a highest temperature change ratio from a regeneration efficiency change ratio was large, and the highest temperature of the plugged honeycomb structure was not raised, but a regeneration efficiency was improved. Furthermore, the larger "the F value" is, the smaller a temperature difference change ratio becomes. Therefore, the plugged honeycomb structure is suitably usable as a filter to trap particulate matter. Specifically, to Comparative Example 1, in each of Examples 1 to 3, a characteristic comparison (a heat capacity C1) was small, and hence an increased F value was obtained as a result. It was possible to confirm similar results in Examples 4 to 6 to Comparative Example 2 and in Example 7 to Comparative Example 3. In addition, when Example 1 and Example 2, and Example 4 and Example 5 were compared, respectively, there was confirmed the tendency that when a thermal conductivity was high, the regeneration efficiency change ratio enlarged and the F value also enlarged.

Furthermore, in each of Examples 4 to 6, a thermal expansion coefficient of a porous body constituting each outer segment was large, and hence it was confirmed that although the "F value" was small, cracks were decreased as compared with Examples 1 to 3. Therefore, it can be considered that the porous body constituting the outer segment preferably has a higher thermal expansion coefficient than a porous body constituting each inner segment. In particular, when the thermal expansion coefficient of the porous body constituting the outer segment is from 1.20 to 1.60 times as large as the thermal expansion coefficient of the porous body constituting the inner segment, the cracks are decreased.

A plugged honeycomb structure of the present invention can be utilized as an exhaust gas purifying filter to purify an exhaust gas.

DESCRIPTION OF REFERENCE SYMBOLS

1: partition wall, 2: cell, 2a: cell, 2b: cell, 3: circumferential wall, 4: honeycomb structure body, 5: plugging portion, 6: honeycomb segment, 6a and 36a: inner segment, 6b and 36b: outer segment, 7 and 37: bonding layer, 8: outer wall (the outer wall of the honeycomb segment), 11: first end face (the end face), 12: second end face (the end face), 15: central portion, 16: circumferential portion, 34: honeycomb structure body of a segmented structure, 34a: bonded body of the honeycomb segments, and 100: plugged honeycomb structure.

What is claimed is:

1. A plugged honeycomb structure comprising:
   a honeycomb structure body having a plurality of pillar-shaped honeycomb segments each having porous partition walls defining a plurality of cells which become through channels for a fluid and extend from a first end face to a second end face, and a bonding layer to bond the plurality of honeycomb segments to one another so that side surfaces of the honeycomb segments face one another; and
   plugging portions disposed in open ends of predetermined cells in the first end face and open ends of residual cells in the second end face of the honeycomb structure body,
   wherein the honeycomb structure body has, as the plurality of honeycomb segments, outer segments disposed on a circumferential side of the honeycomb structure body in a cross section vertical to an extending direction of the cells and inner segments disposed on an inner side than the outer segments in the cross section,
   a material constituting the outer segments has a smaller heat capacity per unit volume than a material constituting the inner segments, and
   wherein the heat capacity per unit volume of the material constituting the inner segments at 600° C. is from 4.25 to 4.50 J/K/cm$^3$.

2. The plugged honeycomb structure according to claim 1, wherein the heat capacity per unit volume of the material constituting the outer segments is from 0.60 to 0.95 time as large as the heat capacity per unit volume of the material constituting the inner segments.

3. The plugged honeycomb structure according to claim 1, wherein a pressure loss of the outer segments is from 0.90 to 1.10 times as large as a pressure loss of the inner segments.

4. The plugged honeycomb structure according to claim 1, wherein a porous body constituting each of the outer segments has a higher thermal conductivity than a porous body constituting each of the inner segments.

5. The plugged honeycomb structure according to claim 4, wherein the porous body constituting each of the outer segments has a larger thermal expansion coefficient than the porous body constituting the inner segment.

6. The plugged honeycomb structure according to claim 5, wherein the inner segments are constituted of either a material including aluminum titanate or a material including aluminum titanate and α-Al$_2$O$_3$, and
   wherein the outer segments are constituted of SiC, Si, Si$_3$N$_4$, cordierite, mullite, or a material including at least two of these materials.

7. The plugged honeycomb structure according to claim 1, wherein a porous body constituting each of the outer segments has a larger thermal expansion coefficient than the porous body constituting the inner segment.

8. The plugged honeycomb structure according to claim 7, wherein the thermal expansion coefficient of the porous body constituting the outer segment is from 1.20 to 1.60 times as large as the thermal expansion coefficient of the porous body constituting the inner segment.

9. The plugged honeycomb structure according to claim 1, wherein the inner segments are constituted of either a material including aluminum titanate or a material including aluminum titanate and $\alpha\text{-}Al_2O_3$.

10. The plugged honeycomb structure according to claim 1, wherein the outer segments are constituted of SiC, Si, $Si_3N_4$, cordierite, mullite, or a material including at least two of these materials.

11. The plugged honeycomb structure according to claim 1, wherein in a cross section of the honeycomb structure body which is vertical to the cell extending direction, an area ratio of the inner segments to the outer segments is from 70/30 to 10/90.

12. The plugged honeycomb structure according to claim 1, wherein in the cross section of the honeycomb structure body which is vertical to the cell extending direction, the inner segments and the outer segments are linearly symmetrically disposed.

13. The plugged honeycomb structure according to claim 1, wherein a porosity of a porous body constituting the honeycomb structure body is from 20 to 50%.

14. The plugged honeycomb structure according to claim 1, wherein an exhaust gas purifying catalyst is loaded onto at least one of each surface of the partition walls of the honeycomb structure body and each pore of the partition walls.

* * * * *